Patented Feb. 13, 1951

2,541,342

UNITED STATES PATENT OFFICE 2,541,342

BASIC 9,10-DIHYDRO-9-ANTHRYL CARBINOLS AND SALTS THEREOF

John W. Cusic, Skokie, Ill., assignor to G. D. Searle & Co., Chicago, Ill., a corporation of Illinois No Drawing. Application August 27, 1948, Serial No. 46,557

13 Claims. (Cl. 260—247.7)

1

This invention relates to basic 9,10-dihydro-9-anthryl carbinols, to salts thereof, and to processes for producing such compounds. More particularly, this invention relates to chemical compositions of matter having the general structural formula

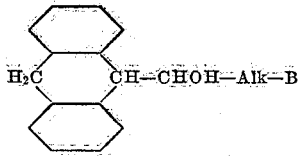

wherein Alk is a lower alkylene radical and B is an aliphatic-type amino radical.

In the foregoing structural formula, Alk represents alkylene radicals containing 2 to 4 carbon atoms, and includes ethylene, propylene, trimethylene, tetramethylene, and butylene radicals. The amino radical, B, represents secondary and tertiary (i. e., aprimary) organic amino groups, particularly mono- and dialkylamino groups. The preferred form of B is a dialkylamino radical wherein the alkyl radicals are lower alkyl radicals containing 1 to 4 carbon atoms, and wherein the radicals may be the same or different. Other aliphatic amino radicals which are within the scope of this invention include hydroxyalkylamino radicals such as β-hydroxyethylamino, β-hydroxypropylamino, and alkylated derivatives of such amino radicals. B represents also aliphatic-type amino radicals such as morpholino, piperidino, pyrrolidino and alkylated derivatives thereof.

The compounds of this invention are prepared by reducing the carbonyl group of an aminoalkyl 9,10-dihydro-9-anthryl ketone of the general formula

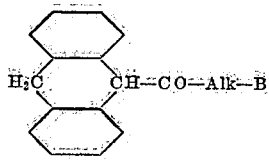

Amino ketones of this type are disclosed in my copending application Serial No. 683,145, filed July 12, 1946, now Patent No. 2,450,122. The reduction can be carried out by catalytic means, preferably with a noble metal catalyst, or it can

2 be carried out by chemical means, as for example, with aluminum isopropoxide and isopropanol.

The compounds of my invention are of value as pharmaceutical agents, as surface-active agents, and as intermediates in the preparation of complex organic substances such as medicinal agents and dye-stuffs. Certain of the substances are of value as antispasmodic or antihistaminic drugs. For such purposes, the basic carbinols may be used either in the form of the free bases or of salts with acids which in therapeutic dosages are non-toxic. Among the acids which are suitable for this purpose are hydrochloric, hydrobromic, sulfuric, phosphoric, sulfamic, tartaric, citric, lactic, malic, benzoic, acetic, and the like. By the addition of alkyl, aralkyl, or alkylene halides, or esters of aromatic sulfonic acids and sulfuric acid, there can be produced quaternary ammonium salts. Preferred compounds for this purpose include methyl chloride, methyl iodide, dimethyl sulfate, benzyl chloride, ethyl bromide, and ethyl p-toluenesulfonate. The salts of the basic carbinols are generally crystalline solids which are soluble in water and constitute a preferred form of my invention.

My invention is further disclosed by the following examples, which are provided solely for the purpose of illustration, and which are not intended to limit the invention in spirit or in scope. The amounts of materials are given in parts by weight unless otherwise noted.

Example 1

A. 370 parts of 9,10-dihydroanthracene and 393 parts of β-chloropropionyl chloride are dissolved in 500 parts of carbon disulfide and cooled to about 0° centigrade. This solution is agitated and 285 parts of anhydrous aluminum chloride are added in portions over a period of about ½ hour. The mixture is agitated at low temperature for about 2 hours more and then allowed to stand for about 15 hours at room temperature. The carbon disulfide is removed by decantation and the residue is treated with ice and dilute hydrochloric acid. This mixture is extracted with benzene. The benzene solution is washed with water and dried. The benzene and other volatile constituents are removed by evaporation under vacuum.

B. The 9-β-chloropropionyl - 9,10 - dihydroanthracene obtained above is dissolved in toluene containing 400 parts of dimethylamine, and the solution is heated in a closed vessel at about 100° C. for about 10 hours. The chilled mixture is filtered to remove amine hydrochloride. The filtrate is warmed to expel excess dimethylamine and then it is diluted with ether and treated with alcoholic hydrogen chloride. The precipitate of 9-β-dimethylaminopropionyl-9,10-dihydroanthracene hydrochloride is dissolved in hot water, treated with decolorizing charcoal, chilled and made alkaline. The base is extracted with ether. The ether extract is filtered and dried. The ether solution is treated with alcoholic hydrogen chloride and the resulting purified chrystalline 9-β-dimethylaminopropionyl-9,10-dihydroanthracene is crystallized from isopropanol diluted with ether. It melts at 177–178° C.

C. 120 parts of 9-β-dimethylaminopropionyl-9,10-dihydroanthracene hydrochloride are dissolved in 800 parts of alcohol and reduced at about 50 pounds pressure in the presence of platinum oxide. The reduction is complete in approximately 2 hours. The solution is filtered and evaporated. The residue is triturated in dry ether. β-dimethylaminoethyl-9,10-dihydro-9-anthryl-carbinol hydrochloride thus obtained melts at 149–150° C. The base has the formula

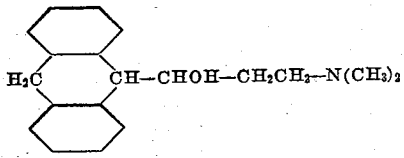

By a series of reactions similar to the above, 9-β-dibutylaminopropionyl-9,10-dihydroanthracene hydrochloride is produced. On hydrogenation in alcohol over palladium-charcoal at low hydrogen pressure, there is produced β-dibutylaminoethyl-9,10-dihydro-9-anthryl-carbinol hydrochloride. The corresponding base has the formula

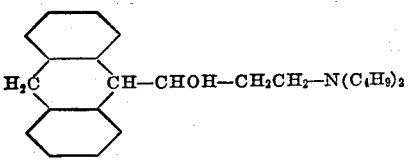

Example 2

10 parts of 9-β-dimethylaminopropionyl-9,10-dihydroanthracene hydrochloride are suspended in 80 parts of benzene and reacted with alkali. The benzene solution of the base is dried and then reacted with 7 parts of methyl chloride in 33 parts of acetone for about 18 hours. The crystalline methochloride is removed by filtration and recrystallized from isopropanol. It melts at 184° C.

Example 3

10 g. of β-dimethylaminoethyl-9,10-dihydro-9-anthryl carbinol hydrochloride are converted to the methochloride by the method of Example 2. The product so obtained melts at 220° C.

Example 4

A. 15 parts of 9-β-chloropropionyl-9,10-dihydroanthracene in 100 parts of toluene containing 20 parts of diethylamine are heated in a closed vessel at about 100° C. for 8–10 hours. The diethylamine hydrochloride is removed and the solution is warmed under vacuum to drive off excess amine. Then it is chilled, diluted with ether and treated with alcoholic hydrogen chloride. The 9-β-diethylaminopropionyl-9,10-dihydroanthracene hydrochloride is purified through the base as in Example 1B. This salt forms a gummy solid which could not be crystallized.

B. 10 parts of 9-β-diethylaminopropionyl-9,10-dihydroanthracene hydrochloride in 80 parts of alcohol are reduced at about 50 pounds pressure in the presence of platinum oxide. After the reduction is complete the catalyst is removed by filtration and the filtrate is evaporated under vacuum. There is thus obtained β-diethylaminoethyl-9,10-dihydro-9-anthryl-carbinol hydrochloride. The base has the formula

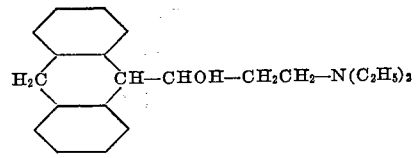

Example 5

A. 75 parts of 9-β-chloropropionyl-9,10-dihydroanthracene in 500 parts of dry toluene containing 115 parts of morpholine are reacted as in Example 1B. The amine hydrochloride is removed from the chilled reaction mixture. Then the solution is diluted with ether and treated with an excess of dry hydrogen chloride in ether. The 9-β-morpholinopropionyl-9,10-dihydroanthracene hydrochloride precipitates as an oil. This is separated, purified through the base by the method of Example 1B, converted in ether solution to the hydrochloride and recrystallized from isopropanol; melting point 169–170° C.

B. 13 parts of 9-β-morpholinopropionyl-9,10-dihydroanthracene hydrochloride in 80 parts of alcohol are reduced at about 50 pounds pressure in the presence of platinum oxide. After the reduction is complete (in 2–3 hours) the catalyst is removed and the solution evaporated. The residue of β-morpholinoethyl-9,10-dihydro-9-anthryl-carbinol hydrochloride is crystallized by trituration in ether and recrystallized from isopropanol; M. P. 199–201° C. The base has the formula

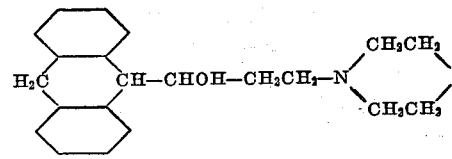

Example 6

To a boiling mixture of 200 parts of piperidine hydrochloride and 53 parts of paraformaldehyde in solution of equal parts of benzene and nitrobenzene are added 330 parts of 9-propionyl-9,10-dihydroanthracene. After two hours of refluxing the reaction mixture is distilled to remove benzene and water (formed during the reaction). More benzene is added and distilled off to complete the removal of water. Then dry ether is added to precipitate β-piperidinoisopropyl 9,10-dihydroanthryl ketone hydrochloride. This salt melts at 173–175° C.

10 parts of the above salt in 80 parts of methanol are reduced as in Example 4 with platinum oxide catalyst. After removal of the catalyst and evaporation of the solvent there is obtained β-piperidinoisopropyl-9,10-dihydro-9-anthrylcarbinol hydrochloride. The base has the formula

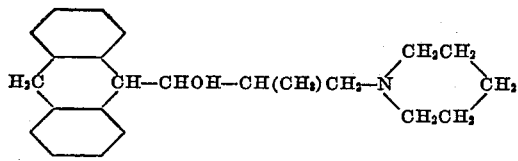

I claim:
1. A member of the group consisting of a basic compound of the formula

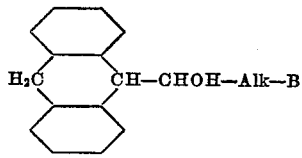

wherein Alk is a lower alkylene radical and B is a basic radical selected from the group consisting of di(lower alkyl)-amino, N-piperidino and N-morpholino radicals, and salts thereof.

2. A salt of a basic compound of the formula

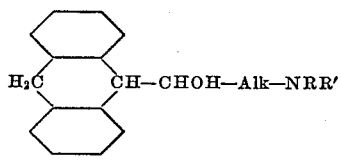

wherein Alk is a lower alkylene radical, and R and R' are lower alkyl radicals.

3. A salt of a dialkylaminoethyl-9,10-dihydro-9-anthrylcarbinol of the formula

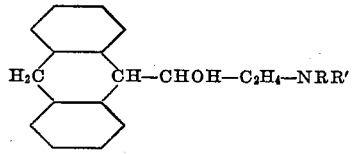

wherein R and R' are lower alkyl radicals.

4. A salt of $\beta$-dimethylaminoethyl-9,10-dihydro-9-anthrylcarbinol.

5. $\beta$ - dimethylaminoethyl - 9,10-dihydro-9-anthrylcarbinol hydrochloride.

6. $\beta$-dimethylaminoethyl - 9,10 - dihydro-9-anthrylcarbinol methochloride.

7. A salt of a basic compound of the formula

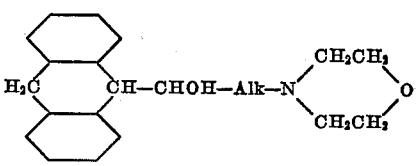

wherein Alk is a lower alkylene radical.

8. A salt of a basic compound of the formula

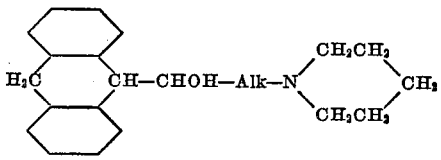

wherein Alk is a lower alkylene radical.

9. A salt of a piperidinopropyl-9,10-dihydro-9-anthrylcarbinol.

10. A salt of a $\beta$-piperidinoisopropyl-9,10-dihydro-9-anthrylcarbinol.

11. $\beta$-piperidinoisopropyl - 9,10-dihydro-9-anthrylcarbinol hydrochloride.

12. A salt of $\beta$-morpholinoethyl-9,10-dihydro-9-anthrylcarbinol.

13. $\beta$-morpholinoethyl - 9,10 - dihydro-9-anthrylcarbinol hydrochloride.

JOHN W. CUSIC.

REFERENCES CITED

The following references are of record in the file of this patent:

UNITED STATES PATENTS

| Number | Name | Date |
|---|---|---|
| 1,752,617 | Schulemann et al. | Apr. 1, 1930 |
| 1,978,539 | Klarer et al. | Oct. 30, 1934 |
| 1,980,638 | Scheuing et al. | Nov. 13, 1934 |
| 2,317,303 | Ruigh et al. | Apr. 20, 1943 |
| 2,443,796 | Martin et al. | June 22, 1948 |
| 2,450,122 | Cusic | Sept. 28, 1948 |

FOREIGN PATENTS

| Number | Country | Date |
|---|---|---|
| 98,713 | Switzerland | Apr. 16, 1923 |